No. 642,515. Patented Jan. 30, 1900.
J. B. BOUTILLIER.
ARMORED CONDUIT.
(Application filed Nov. 1, 1899.)
(No Model.)
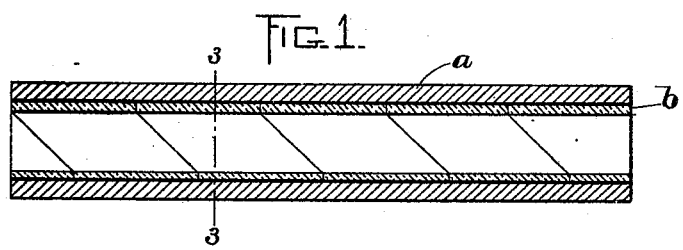
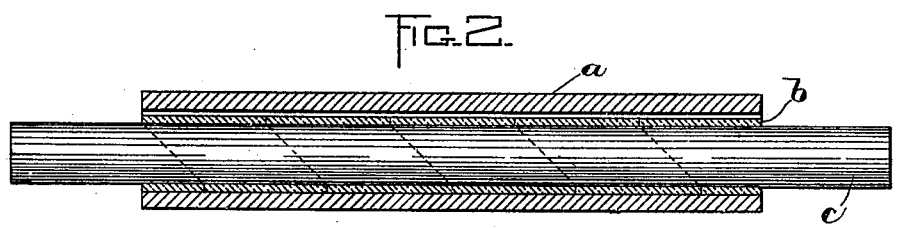
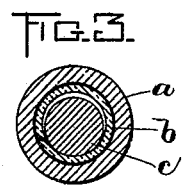
WITNESSES:
INVENTOR:

UNITED STATES PATENT OFFICE.

JACOB B. BOUTILLIER, OF BOSTON, MASSACHUSETTS, ASSIGNOR OF ONE-HALF TO W. B. HUNTER, OF SAME PLACE.

ARMORED CONDUIT.

SPECIFICATION forming part of Letters Patent No. 642,515, dated January 30, 1900.

Application filed November 1, 1899. Serial No. 735,469. (No model.)

*To all whom it may concern:*

Be it known that I, JACOB B. BOUTILLIER, of Boston, in the county of Suffolk and State of Massachusetts, have invented certain new and useful Improvements in Armored Conduits, of which the following is a specification.

This invention relates to conduits for electric wires, and especially for those used above ground and in buildings, the body of the conduit being a metal pipe.

The invention has for its object to provide a conduit of this class with a lining which is not only a non-conductor of electricity, but is also incombustible.

The invention consists in an armored conduit comprising a metal tube or pipe and a tubular lining composed of a helically-wound strip of sheet-asbestos expanded against the internal surface of the pipe and preferably cemented to the interior of the pipe.

Of the accompanying drawings, forming a part of this specification, Figure 1 represents a longitudinal section of an armored conduit embodying my invention. Fig. 2 represents a longitudinal section showing the metal pipe and a side view showing the lining wound upon a mandrel in a contracted form and inserted loosely in the pipe. Fig. 3 represents a section on line 3 3 of Fig. 1, showing the mandrel in place as it appears when used to expand the lining against the internal surface of the pipe.

The same letters of reference indicate the same parts in all the figures.

$a$ represents a length of metal pipe of any suitable construction, and $b$ represents a lining of sheet-asbestos formed by helically winding a strip of said material upon an arbor $c$ in such manner as to form a practically continuous tube, the diameter of which when wound upon the mandrel is less than the internal diameter of the pipe $a$, so that the mandrel, with the lining-tube wound thereon, can be freely inserted in the pipe $a$, as shown in Fig. 2. When the lining is thus inserted, the mandrel is rotated in the direction required to unwind the strip forming the lining, thus causing the lining to expand and fit snugly against the interior of the pipe. When this has been done, the lining is additionally expanded by moving the mandrel laterally, while the tube rests upon a flat bed or support, thus rolling the lining between the mandrel and the tube and compressing the lining sufficiently to press it firmly against the inner surface of the tube and at the same time tighten the helical seam or joint, so that the edges of the strip forming such seam will be closely abutted together.

I prefer to interpose adhesive material or cement between the lining $b$ and the inner surface of the tube $a$ to cause the firm adherence of the lining to the tube. This can be accomplished in various ways, such as by applying a film or coating of cement to the interior of the tube or to the exterior of the lining before the latter is expanded. A suitable mode of operation would be to coat the exterior of the lining with powdered resin and after the lining has been expanded heat the tube and lining sufficiently to melt the resin. Any other suitable cement may be employed, such as stove or furnace putty.

It will be seen that the described armored conduit comprises a lining which not only perfectly insulates the wires in the conduit from the metal pipe, but is also indestructible by heat.

I claim—

1. An armored conduit comprising a rigid metal tube or pipe, and a tubular lining composed of a helically-wound strip of sheet-asbestos expanded against the internal surface of the rigid pipe, to close the helical seam or joint between the convolutions of the strip.

2. An armored conduit comprising a rigid metal tube or pipe, and a tubular lining composed of a helically-wound strip of sheet-asbestos expanded against the internal surface of the pipe to close the helical seam or joint between the convolutions, said lining being cemented to the interior of the pipe to preserve said closed seam or joint.

In testimony whereof I have affixed my signature in presence of two witnesses.

JACOB B. BOUTILLIER.

Witnesses:
 WM. B. HUNTER,
 C. F. BROWN.